(12) United States Patent
Okamura et al.

(10) Patent No.: US 8,570,690 B2
(45) Date of Patent: Oct. 29, 2013

(54) MAGNETIC SENSOR HAVING A HARD BIAS SEED STRUCTURE

(75) Inventors: Susumu Okamura, Odawara (JP);
Hiroyuki Hoshiya, Odawara (JP);
Takahiro Ibusuki, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/164,610

(22) Filed: Jun. 20, 2011

(65) Prior Publication Data

US 2012/0320473 A1 Dec. 20, 2012

(51) Int. Cl.
*G11B 5/39* (2006.01)

(52) U.S. Cl.
USPC .................................. 360/324.12

(58) Field of Classification Search
USPC ............... 360/324.1, 324.11, 324.12, 324.2, 360/327.3
See application file for complete search history.

(56) References Cited

U.S. PATENT DOCUMENTS

| | | | |
|---|---|---|---|
| 6,636,400 B2 | 10/2003 | Pinarbasi et al. | |
| 6,747,853 B2 | 6/2004 | Hayashi et al. | |
| 6,754,053 B2 | 6/2004 | Yoshikawa et al. | |
| 6,759,120 B2 | 7/2004 | Jongill et al. | |
| 6,876,525 B2* | 4/2005 | Lin et al. | 360/324.12 |
| 6,967,825 B2* | 11/2005 | Gill | 360/324.12 |
| 7,072,155 B2 | 7/2006 | Takahashi et al. | |
| 7,116,527 B1 | 10/2006 | Fukuzawa et al. | |
| 7,177,121 B2 | 2/2007 | Kojima et al. | |
| 7,201,947 B2 | 4/2007 | Liao et al. | |
| 7,411,765 B2* | 8/2008 | Childress et al. | 360/324.1 |
| 7,494,725 B2 | 2/2009 | Maeda et al. | |
| 7,784,171 B2 | 8/2010 | Kagami et al. | |
| 8,004,800 B2* | 8/2011 | Freitag | 360/324.12 |
| 2005/0270704 A1* | 12/2005 | Suzuki et al. | 360/324.11 |
| 2010/0214696 A1 | 8/2010 | Matsuzawa et al. | |

OTHER PUBLICATIONS

Ogwu et al., "Electrical resistivity of copper oxide thin films prepared by reactive magnetron sputtering," Journal of Achievements in Materials and Manufacturing Engineering, vol. 24, Issue 1, Sep. 2007, pp. 172-177.
Yoo et al., "Free layer stabilized spin valve through a non-magnetic spacer," 2004 Wiley-VCH Verlag GmbH & Co., Phys. Stat. Sol. (a) vol. 201, No. 8, pp. 1739-1742.
Ozatay et al., "Analytical electron microscopy study of growth mechanism for smoothing of metallic multilayer thin films," 2006 American Institute of Physics, Applied Physics Letters, vol. 89, pp. 162509/1-162509/3.

* cited by examiner

*Primary Examiner* — Jefferson Evans
(74) *Attorney, Agent, or Firm* — Zilka-Kotab, PC

(57) ABSTRACT

A magnetic sensor having a novel hard bias structure that provides reduced gap spacing for increased data density. The magnetic sensor includes a sensor stack with first and second sides formed on a magnetic shield. A thin insulation layer is formed over the sides of the sensor stack and over the bottom shield. An under-layer comprising Cu—O is formed over the insulation layer and a hard magnetic bias layer is formed over the under-layer. The use of Cu—O as the under-layer allows the under-layer to be made thinner while still maintaining excellent magnetic properties in the hard bias layers formed there-over. This reduced thickness of the under-layer allows the gap spacing (spacing between the top and bottom magnetic shields) to be reduced, which in turn provides increased data density.

20 Claims, 10 Drawing Sheets

MAGNETIC SENSOR HAVING A HARD BIAS SEED STRUCTURE

FIELD OF THE INVENTION

The present invention relates to magnetic data recording and more particularly to a magnetic sensor having a hard bias structure with a novel seed layer structure for improved free layer biasing at reduced read gap thickness.

BACKGROUND OF THE INVENTION

The heart of a computer is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing, the write and read heads are employed for writing magnetic impressions to and reading magnetic impressions from the rotating disk. The read and write heads are connected to processing circuitry that operates according to a computer program to implement the writing and reading functions.

The write head includes at least one coil, a write pole and one or more return poles. When a current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic disk, thereby recording a bit of data. The write field, then, travels through a magnetically soft under-layer of the magnetic medium to return to the return pole of the write head.

A magnetoresistive sensor such as a Giant Magnetoresistive (GMR) sensor, or a Tunnel Junction Magnetoresisive (TMR) sensor can be employed to read a magnetic signal from the magnetic media. The sensor includes a nonmagnetic conductive layer (if the sensor is a GMR sensor) or a thin nonmagnetic, electrically insulating barrier layer (if the sensor is a TMR sensor) sandwiched between first and second ferromagnetic layers, hereinafter referred to as a pinned layer and a free layer. Magnetic shields are positioned above and below the sensor stack and can also serve as first and second electrical leads so that the electrical current travels perpendicularly to the plane of the free layer, spacer layer and pinned layer (current perpendicular to the plane (CPP) mode of operation). The magnetization direction of the pinned layer is pinned perpendicular to the air bearing surface (ABS) and the magnetization direction of the free layer is located parallel to the ABS, but free to rotate in response to external magnetic fields. The magnetization of the pinned layer is typically pinned by exchange coupling with an antiferromagnetic layer.

When the magnetizations of the pinned and free layers are parallel with respect to one another, scattering of the conduction electrons is minimized and when the magnetizations of the pinned and free layer are antiparallel, scattering is maximized. In a read mode the resistance of the spin valve sensor changes about linearly with the magnitudes of the magnetic fields from the rotating disk. When a sense current is conducted through the spin valve sensor, resistance changes cause potential changes that are detected and processed as playback signals.

In order to minimize data density it is necessary to minimize the read gap of the sensor. The read gap is the distance between the magnetic shields formed at the top and bottom of the sensor. However, as this gap is reduced, certain problems arise with regard to maintaining stable biasing of the magnetic free layer. Therefore, there remains a need for a structure that can provide robust magnetic biasing while also allowing the read gap to be reduced to achieve the required data density increases needed for future magnetic disk drives.

SUMMARY OF THE INVENTION

The present invention provides a magnetic sensor that includes, a sensor stack having first and second sides; first and second under-layers each adjacent to a side of the sensor stack, each of the first and second under-layers comprising Cu—O; and first and second hard magnetic bias layers each formed over one of the first and second under-layers.

The sensor stack can be formed over a bottom magnetic shield, and a thin layer of insulation can be formed over the sides of the sensor stack and over the bottom magnetic shield. The under-layer can then be formed over this insulation layer and the hard bias layer formed over the under-layer.

The use of Cu—O as the under-layer advantageously allows the under-layer to be made thinner than has previously been possible; while still providing excellent magnetic properties in the hard bias layer formed there-over. This reduced thickness of the under-layer allows the gap spacing (distance between the upper and lower shields) to be reduced. This in turn increases advantageously increases the data density of a magnetic recording system in which the magnetic sensor is used.

These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
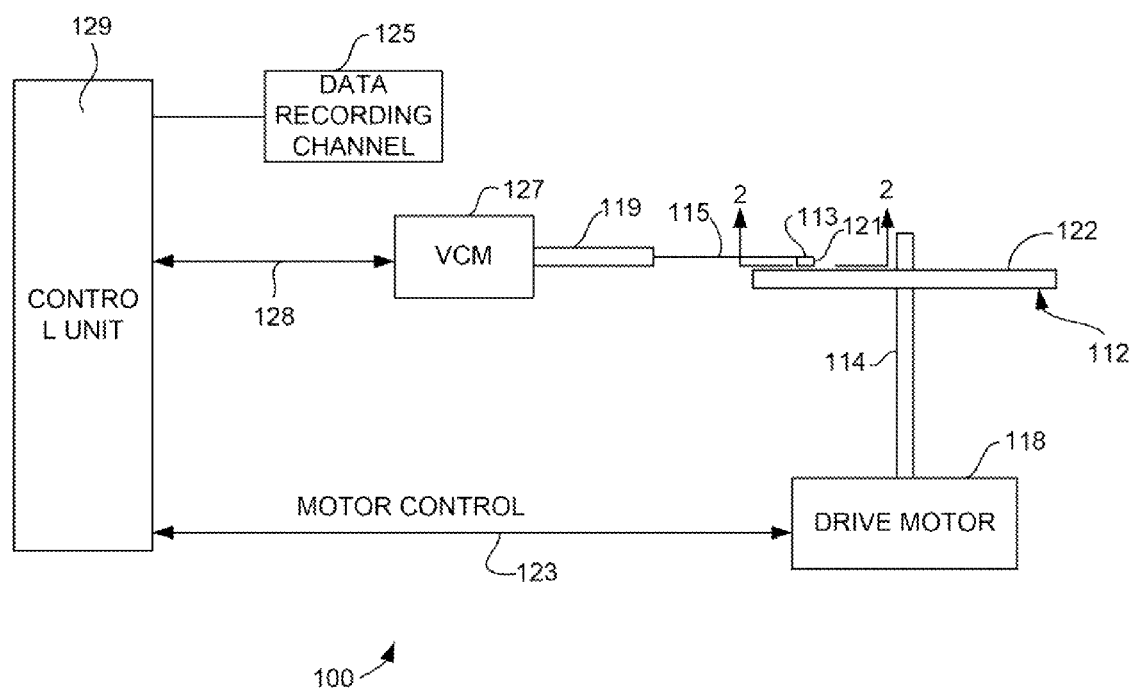
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121. As the magnetic disk rotates, slider 113 moves radially in and out over the disk surface 122 so that the magnetic head assembly 121 can access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
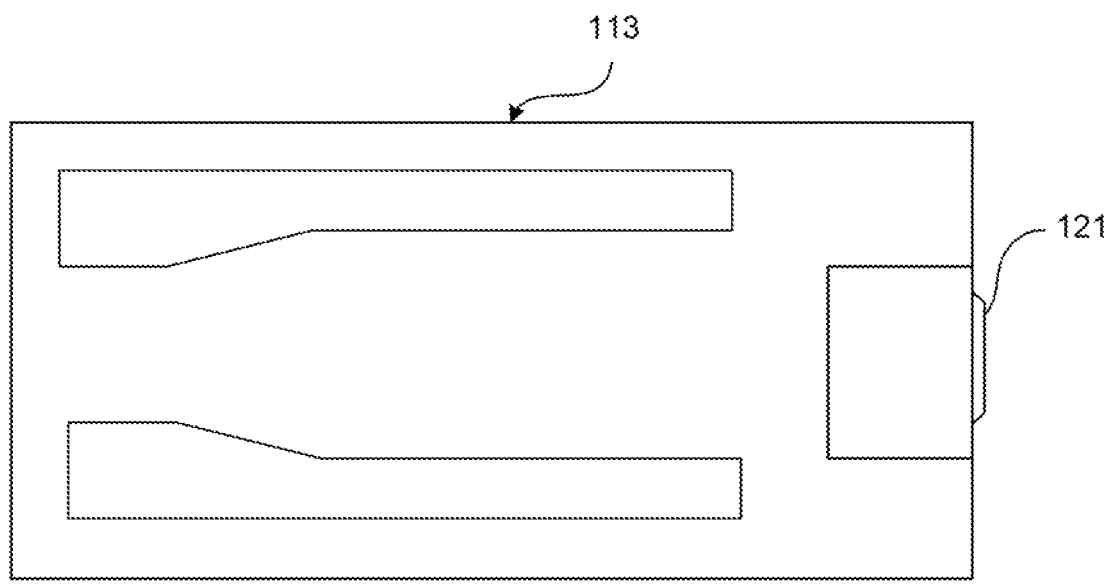
FIG. 2 is an ABS view of a slider illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system and the accompanying illustration of FIG. 1 are for representation purposes only. It should be apparent that disk storage systems may contain a large number of disks and actuators, and each actuator may support a number of sliders.

Figure 3:
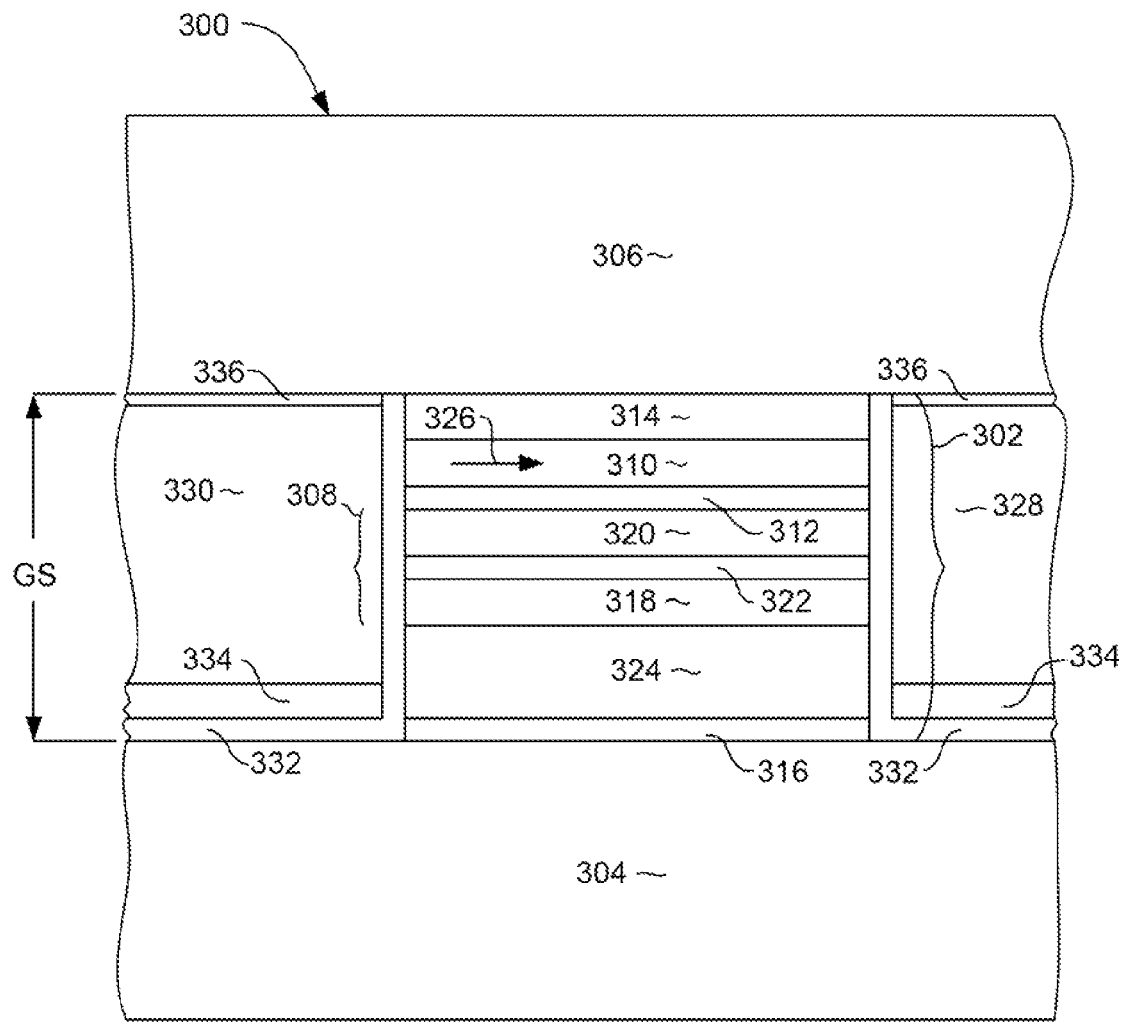
FIG. 3 is an ABS view of an example of a magnetoresistive sensor that might be constructed by a method of the present invention.

FIG. 3, is an air bearing surface (ABS) view of a magnetic sensor 300 according to an embodiment of the invention. The sensor 300 includes a sensor stack 302 that is sandwiched between first and second magnetic shields 304, 306 that can be constructed of an electrically conductive magnetic material so that they function as electrical leads as well as magnetic shields.

The sensor stack 302 can include a magnetic pinned layer structure 308 a magnetic free layer structure 310 and a non-magnetic barrier or spacer layer 312 sandwiched between the free layer structure and pinned layer structure 308, 310. If the sensor 300 is a giant magnetoresistive (GMR) sensor, then the non-magnetic layer 312 is an electrically conductive material such as Cu. On the other hand, if the sensor 300 is a tunnel junction magnetoresistive sensor (TMR), then the layer 312 is thin, electrically insulating material.

A capping layer 314 can be formed at the top of the sensor stack to protect other layers of the sensor stack 302 during manufacture. A seed layer 316 may also be provided at the bottom of the sensor stack to initiate a desired grain structure in the above layers of the sensor stack 302.

The pinned layer structure can be an antiparallel coupled structure that includes first and second magnetic layers 318, 320 that are antiparallel coupled with on another across a non-magnetic antiparallel coupling layer 322 sandwiched between the layers 318, 320. The non-magnetic antiparallel coupling layer can be a layer of Ru having a thickness of about 4 Angstroms. A layer of antiferromagnetic material (AFM layer) constructed of a material such as IrMn or PtMn can be exchange coupled with the layer 318 to strongly pin the magnetization of the layer 318 in a first direction perpendicular with the ABS. The antiparallel coupling between the layers 318, 320 pins the magnetization of the layer 320 in an opposite direction, antiparallel with that of the layer 318 and also perpendicular with the ABS.

The magnetic free layer structure 310 has a magnetization that is biased in a direction that is generally parallel with the air bearing surface as indicated by arrow 326, but which is able to move in response to an externally applied magnetic field. The direction of the magnetization 326 is maintained in this direction by magnetostatic coupling with hard magnetic bias layers 328, 330. The hard magnetic bias layers 328, 330 can be constructed of a material such as Co—Pt or Co—Pt—Cr. This material, when formed with a desired grains structure (as will be discussed below) has hard magnetic properties that allow the layers 328, 330 to maintain their magnetizations to provide a stable bias field to bias the magnetization 326 of the free layer 310.

The hard bias layers 328, 330 are separated from the sensor stack 302 and from the bottom shield 304 by a thin insulation layer 332, which can be a material such as alumina. This layer 332 prevents sense current from being shunted through the hard bias layers 328, 330 between the shields 304, 306 during operation.

As mentioned above, in order for the layers 328, 330 to provide strong magnetic biasing it is necessary that the hard bias layers 328 have a desired grain structure. In order to ensure that the hard bias layers 328, 330 have this grain structure, the hard bias layers 328, 330 are deposited on a seed layer 334 that is deposited before the hard bias layers, and which initiates a desired grain structure on the hard bias layers 328, 330 deposited there-over. A non-magnetic capping layer 336 is also provided above the hard bias layers 328, 330 in order to magnetically decouple the hard bias layers 328, 330 from the above shield 306. These capping layers 336 can be constructed of a material such as Ta or another such suitable material.

One of the parameters that is of importance to sensor performance is the gap spacing of the sensor. With reference still to FIG. 3, the gap spacing GS is the spacing between the magnetic shields 304, 306. This gap spacing GS is important because it determines the length of a bit of data that can be read by the sensor. Therefore, the smaller the gap spacing GS, the smaller the magnetic bit is and the greater the data density of the recording system is. In order to narrow the gap spacing GS, it is necessary to reduce the thickness of the hard bias layers 328, 330. This however results in a reduction in amount of magnetization provided by the hard bias layers 328, 330 to stabilize the free layer 310, so the amount by which the thickness of the hard bias layers 328, 330 can be reduced is limited. In practice however, the overall structure in the side regions not only includes the hard bias layers 328, 330, but also the insulation layer 332, seed layer 334, hard bias layers 328, 330 and capping layer. Therefore, in theory the gap thickness could be reduced by reducing any of these other layers 332, 334 or 336. However, there are limits to the amount by which the layers 332, 336 can be reduced from the point of view of reliability and stability.

As mentioned above, the seed layer 334 is necessary to maintain good free layer biasing properties in the hard bias layers 328. However, as also mentioned above, the thickness of the seed layer 334 contributes to the gap spacing GS. It would therefore be desirable to reduce the thickness of the seed layer 334 as much as possible in order to minimize the gap spacing GS. A problem that has been experienced with prior art seed layers, however, is that when their thickness is reduced about 30 Angstroms or less, they lose their ability effectively maintain the desired grain structure in the hard bias layers. With a conventional Cr-based Body Centered Cubic (BCC) material such as Cr—Mo is used for the seed layer, there are problems in that the hard magnetic characteristics cannot be achieved if the thickness is 30 Angstroms or less. In this case, the hard bias layer demonstrates soft magnetic properties without achieving the required crystalline structure. In this state it is no longer possible to apply a stable magnetic field to bias the free layer, and the hard bias layers become ineffective.

The present invention overcomes this limitation, however, by providing a novel seed layer 334 that can maintain good properties in the hard bias layers, 328, 330 even when the seed layer 334 is made very thin (e.g. at or below 3 nm). In the present invention, the seed layer 334 is constructed of Cu—O, and can be thinned down to 1-2 nm, which is much thinner than was possible with previously used seed layers. This makes further reduction of gap spacing GS possible without losing free layer biasing strength. In addition, gap between the free layer 310 and the hard bias layers 328, 330 can be reduced, and the magnetic field from the hard bias layers 328, 330 can be introduced more effectively into the free layer. This means that an increase in the hard bias magnetic field of the order of 20% compared with a more conventional Cr-based seed layer can be anticipated for the same gap spacing GS. As a result, greater stability and improved resolution in the magnetic head can be achieved.

In a prior art structure using a Cr—Mo under-layer, when the film thickness was less than 30 Angstroms there was a sharp drop in coercive force and soft magnetic characteristics were demonstrated. When the Cr—Mo under-layer was made thinner, the Co—Pt crystalline structure changed from a Hexagonal Close Packed (HCP) structure to a Face Centered Cubic (FCC) structure, and this was believed to be a factor in hard magnetic characteristics no longer being demonstrated. On the other hand, when Cu—O was used for the under-layer 334, there was no sharp drop in the coercive force of the hard bias layers 328, 330 even when the thickness of the under-layer 334 was less than 30 Angstroms, and a coercive force of 1500 Oe was achieved when the under-layer 334 was only 10 Angstroms. It was also clear that there was high residual magnetic flux density, and good characteristics were demonstrated for the hard bias layers 328, 330. The crystal orientation of the hard bias layers 328, 330 did not change a great deal even when the under-layer was made thinner, and it was possible to provide good hard magnetic characteristics as a result.

Figure 4:
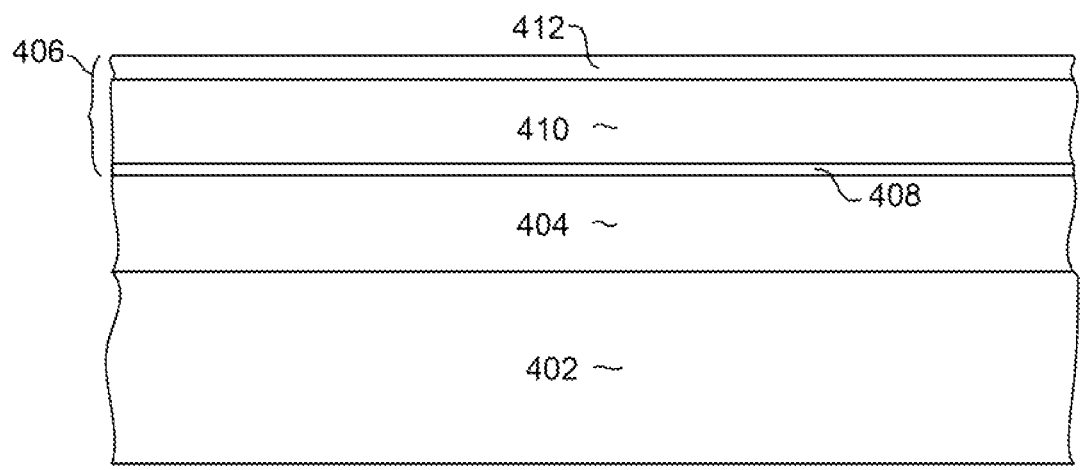
FIGS. 4-10 illustrate a method for manufacturing a magnetic sensor according to an embodiment of the invention.

FIGS. 4-10 illustrate a method for manufacturing a magnetic head according to an embodiment of the invention. With particular reference to FIG. 4, a first magnetic shield 402 is constructed of a magnetic, electrically conductive material such as Co—Fe or Ni—Fe. Then, a plurality of sensor layers 404 are deposited full film on top of the bottom shield 402. The sensor layers 404 can include all of the material layers making up the sensor stack 302 of FIG. 3, although other sensor structures could be used. A series of mask layers 406 are then deposited over the sensor layers 404. The mask layers 406 can include a hard mask 408 formed over the sensor layers 404, an image transfer layer 410 formed over the hard mask 408 and a photoresist layer 412 formed over the image transfer layer. The hard mask layer 408 is preferably constructed of a material that is resistant to chemical mechanical polishing, such as diamond like carbon (DLC). The image transfer layer can be a soluble polyimide material such as DURIMIDE® and can also serve as an anti-reflective coating. The mask 406 can include other additional or different layer, however, and this structure is only by way of example.

Figure 5:
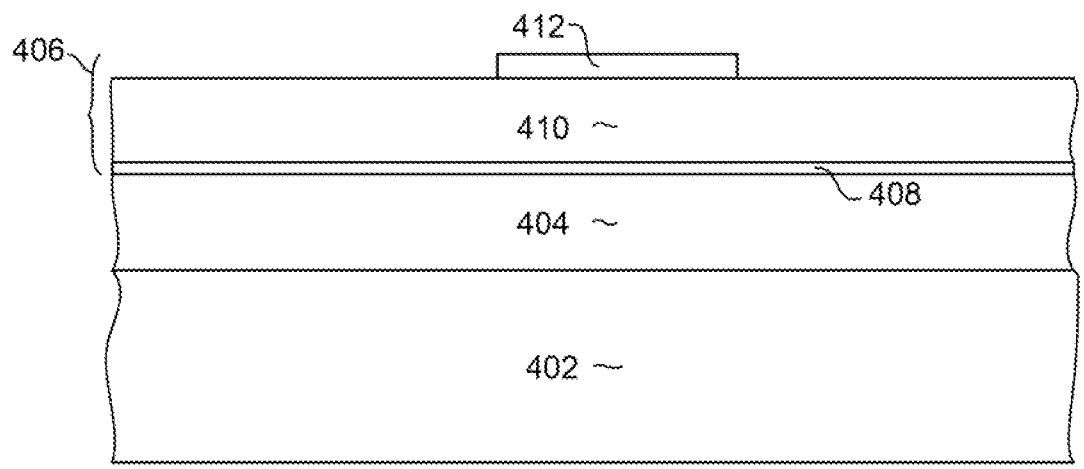
Figure 6:
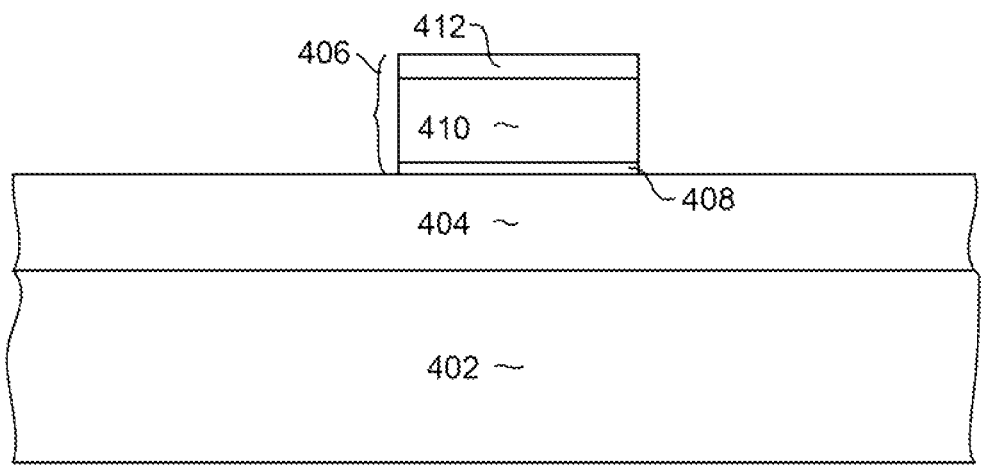
Figure 7:
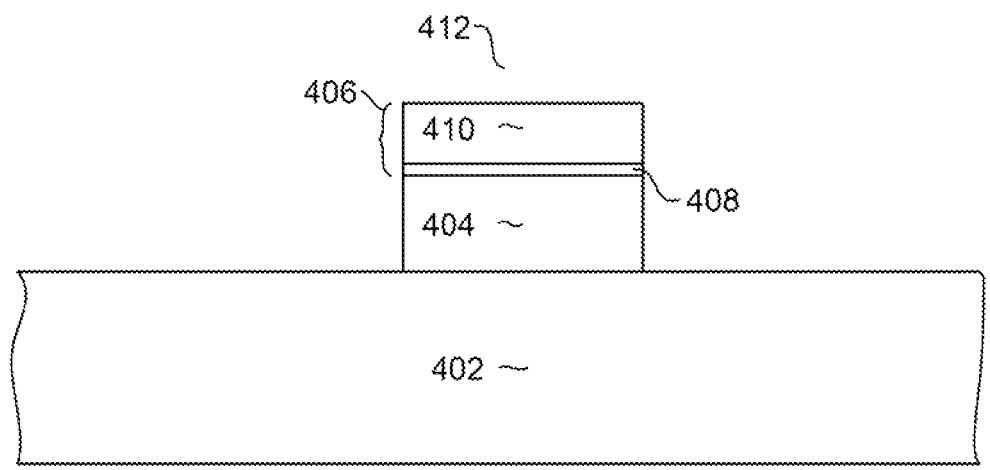

With reference now to FIG. 5, the photoresist layer 412 is photolithographically patterned to define a mask shape as shown that can define a sensor width. Then, a reactive ion etching (RIE) is performed to remove portions of the mask layers 408, 410 that are not protected by the mask 412 to transfer the pattern of the photoresist mask 412 onto the layers 408, 410, leaving a structure as shown in FIG. 6. Then, an ion milling is performed to remove portions of the sensor layers 404 that are not protected by the mask layers 406 to transfer the structure of the mask 406 onto the underlying sensor layers 404, leaving a structure as shown in FIG. 7. This ion milling most likely removes the photoresist (FIG. 6) and a portion of the image transfer layer 410, leaving a reduced mask stack 406 as shown in FIG. 7.

Figure 8:
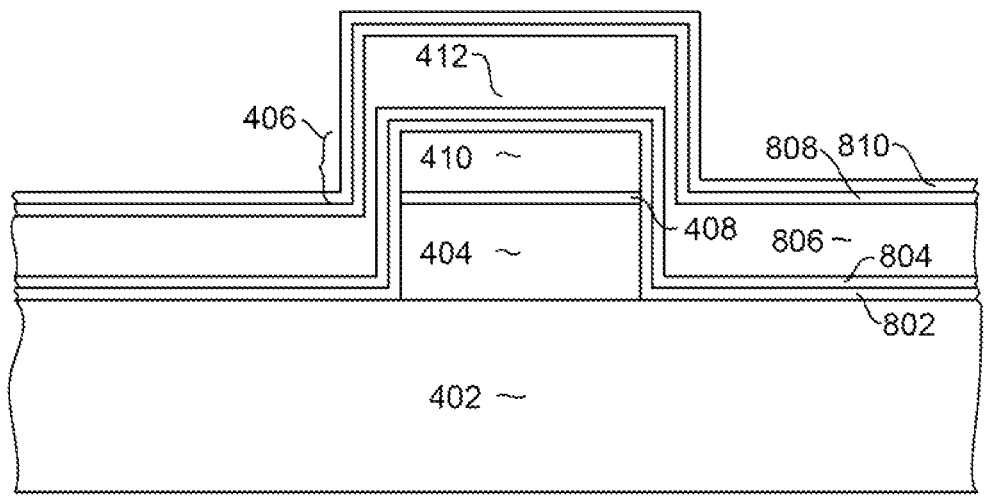

With reference now to FIG. 8, a series of layers are deposited to provide a hard bias structure. First a thin electrically insulating layer 802 is deposited. This is preferably an aluminum oxide layer and is preferably deposited by a conformal deposition process such as atomic layer deposition, (ALD). Then, a novel under-layer 804 is deposited over the insulation layer 802. The under-layer 804 is constructed of a copper oxide material Cu—O. The Cu—O under-layer is preferably deposited by sputter deposition in an Ar/O mixed gas atmosphere. The Cu—O under-layer 804 can be deposited to a thickness of about 30 Angstroms or less. In one possible embodiment of the invention, the Cu—O under-layer 802 can be deposited to a thickness of 10-20 Angstroms or about 15 Angstroms in a sputter deposition chamber at an Ar gas flow rate of about 20 sccm.

After the under-layer 804 has been deposited a hard magnetic bias layer material 806 is deposited. This layer 806 is preferably constructed of Co—Pt or Co—Pt—Cr. Then, a hard bias capping layer 808 is deposited over the hard magnetic bias layer 806. The hard bias capping layer 810 can be a non-magnetic material such as Ta, but could be another material as well. Finally, a layer of material that is resistant to chemical mechanical polishing (CMP resistant material) 810 is deposited to provide a CMP stop layer 810. This layer 810 can be a material such as Diamond Like Carbon (DLC). Alternatively, if the capping layer 808 is material that is resistant to CMP, then this layer 808 can serve as a CMP stop layer, and the additional layer 810 is not needed. The layers 802, 804, 806, 808 are preferably deposited to such a thickness that the layer 808 is level with the top of the sensor stack 404.

Experimental results have shown that when a small proportion of oxygen was introduced into the chamber during deposition of the under-layer 804, the coercive force and the residual saturation magnetic flux density of the applied hard bias layer 806 were both small and soft magnetic characteristics were demonstrated. However, as the amount of oxygen was increased, the hard magnetic characteristics improved, so the coercive force and the residual magnetic flux density increased. The results of structure analysis showed that when the amount of oxygen during Cu film formation was small, Cu—O, like Cu, had an FCC structure, but when the amount of oxygen was increased, monoclinic crystalline Cu—O in which the "C" axis was the preferred orientation plane was formed. The atomic arrangement of the Cu—O top surface was close to a BCC structure (110) plane, but the axis ratio of the top surface unit lattice within the plane was 1.6, which is substantially the same as the axis ratio of HCP structured Co—Pt (100). With a BCC structure (such as that for Cr—Mo), this axis ratio is 1.4 and therefore when it is stacked with HCP structured Co—Pt, compressive and tensile stress is produced within the plane, and it is believed that as a result the required HCP structure is not achieved in the crystalline structure of the hard bias layer, and hard magnetic characteristics are not achieved with a thin Cr—Mo Film.

When a hard magnetic bias layer having an HCP structure such as Co—Pt is formed in this way, it is possible to achieve higher coercive strength and residual magnetic flux density than conventionally with a sufficiently small under-layer 804 film thickness of 10-20 Angstroms by using Cu—O in the under-layer 804.

Figure 9:
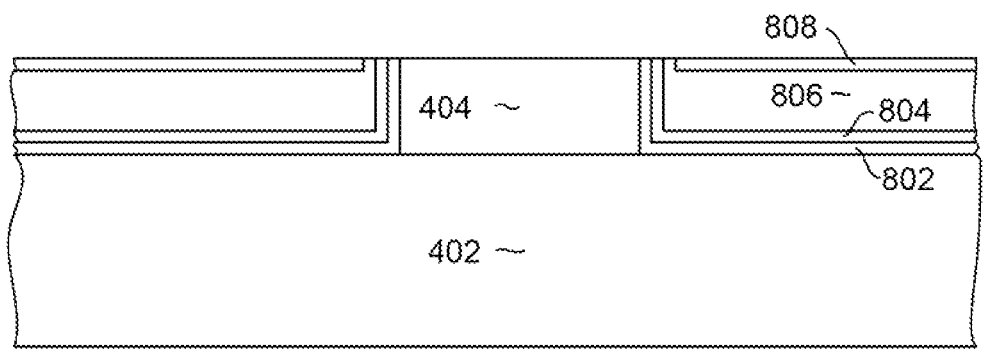

After the layers 802, 804, 806, 808, 810 have been deposited, a chemical mechanical polishing is performed to remove the remaining mask layer 410 and to planarize the structure. Then, a quick reactive ion etching (RIE) can be performed to remove the remaining CMP stop layers 408, 810, leaving a planar structure as shown in FIG. 9.

Figure 10:
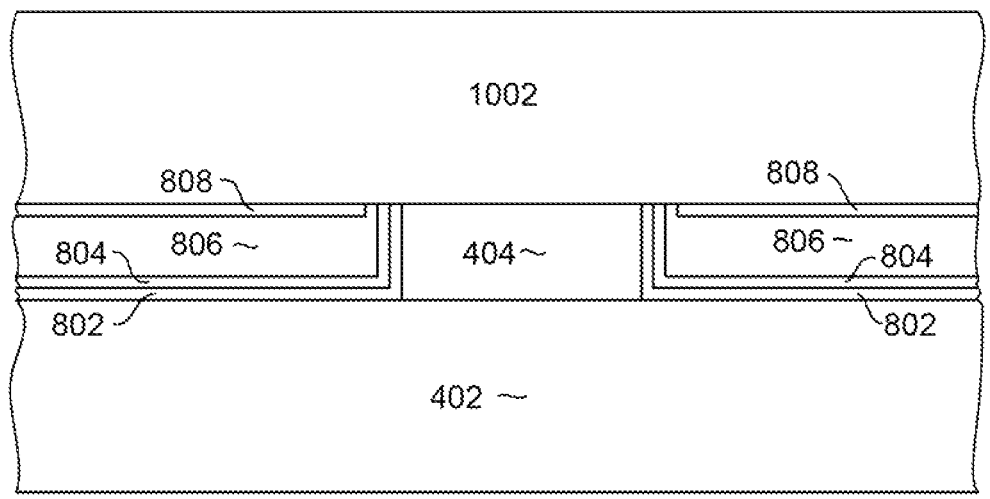

Thereafter, another masking, ion milling and refill process can be performed to define the back edge (e.g. stripe height) of the structure. This process, which will be familiar to those skilled in the art, will not be described in great detail herein for purposes of clarity. Then, with the sensor structure thus formed, an upper magnetic shield 1002 can be formed by an electroplating process, leaving a structure as shown in FIG. 10. Like the bottom shield 402, the top shield 1002 can be formed of an electrically conductive magnetic material such as Ni—Fe or Co—Fe.

In order to confirm the effectiveness afforded y thinning the Cu—O under-layer, the hard bias field intensity applied to a TMR element was calculated using the finite element method. The reading element shapes used in the calculations were assumed to be an existing head element shape (track width of 35 nanometers, distance between shields (Gs) of 30 nm), a standard shield shape, and a standard magnetic hard bias film shape. Furthermore, for the material parameters, the magnetic permeability of the shield was taken as 2000, and the magnetic parameters of the magnetic domain control film were taken as the actual values. Using this model, the magnetic domain control film field with respect to the magnetic moment of the magnetic domain control film for the Cu—O under-layer and a conventional under-layer was calculated.

The saturated magnetic flux density distribution were compared for a structure having a conventional Cr—Mo under-layer with a thickness of 35 Angstroms and for a structure having the novel Cu—O under-layer with a thickness of only 15 Angstroms. When the under-layer was thick, the gap between the upper shield layer and hard bias layer was narrow. As a result, magnetic flux was likely to escape to the shield side where there was low magnetic permeability, and the magnetic flux applied in the region of the free layer was small.

In addition, the magnetic bias field for a conventional structure (having a 45 Angstrom thick Cr—Mo under-layer) was compared with that for a sensor having a 15 Angstrom thick Cu—O under-layer, with respect to the saturated magnetic flux density (tBr) per unit area of the hard bias layer. In the results, tBr was taken as 200 G$\mu$m. In the case of the Cu—O under-layer, the magnetic domain control film field demonstrated was around 20 percent greater compared with the conventional under-layer, and this made it possible to confirm the effectiveness of Cu—O.

In order to further establish the benefits of the novel Cu—O seed layer, actual magnetic sensors were constructed with conventional under-layers and with Cu—O under-layers. The intensity of the biasing field was measured for both types of sensors. The magnetic field dependency of the resistance was obtained by fitting. When the hard bias field was compared, it was found that a high hard bias field was obtained for any hard bias film thickness when the Cu—O under-layer was used. And, the Cu—O under-layer itself can also be thinned, as discussed above. These results were largely consistent with the calculation results.

While various embodiments have been described above, it should be understood that they have been presented by way of example only and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A magnetic sensor, comprising:
   a sensor stack having first and second sides;
   first and second under-layers each adjacent to a side of the sensor stack, each of the first and second under-layers comprising Cu—O; and
   first and second hard magnetic bias layers each formed over one of the first and second under-layers;
   wherein each of the first and second under-layers has a top surface that is close to a body centered cubic structure.

2. The magnetic sensor as in claim 1 wherein each of the under-layers has a thickness of 30 Angstroms or less.

3. The magnetic sensor as in claim 1 wherein each of the under-layers has a thickness of 10-20 Angstroms.

4. The magnetic sensor as in claim 1 wherein each of the under-layers has a thickness of about 15 Angstroms.

5. The magnetic sensor as in claim 1 further comprising non-magnetic capping layer formed over each of the first and second hard magnetic bias layers.

6. The magnetic sensor as in claim 1 wherein each of the first and second hard magnetic bias layers comprises Co—Pt.

7. The magnetic sensor as in claim 1 wherein each of the first and second hard magnetic bias layers comprises Co—Pt—Cr.

8. A magnetic sensor, comprising:
   a sensor stack having first and second sides;
   first and second under-layers each adjacent to a side of the sensor stack, each of the first and second under-layers comprising Cu—O; and
   first and second hard magnetic bias layers each formed over one of the first and second under-layers;
   wherein the under-layer has a top surface with a within the plane axis ratio of 1.6.

9. The magnetic sensor as in claim 8 wherein each of the under-layers has a thickness of 30 Angstroms or less.

10. The magnetic sensor as in claim 8 wherein each of the under-layers has a thickness of 10-20 Angstroms.

11. The magnetic sensor as in claim 8 wherein each of the under-layers has a thickness of about 15 Angstroms.

12. The magnetic sensor as in claim 8 further comprising non-magnetic capping layer formed over each of the first and second hard magnetic bias layers.

13. The magnetic sensor as in claim 8 wherein each of the first and second hard magnetic bias layers comprises Co—Pt.

14. The magnetic sensor as in claim 8 wherein each of the first and second hard magnetic bias layers comprises Co—Pt—Cr.

15. A magnetic sensor, comprising:
a bottom magnetic shield;
a sensor stack formed over the bottom magnetic shield and having first and second sides;
first and second insulation layers, each formed over a side of the sensor stack and over the bottom magnetic shield;
first and second under-layers each formed over at least a portion of one of the first and second insulation layers, each of the under-layers comprising Cu—O; and
first and second hard magnetic bias layers each formed over one of the first and second under-layers;
wherein each of the first and second under-layers has a top surface that is close to a body centered cubic structure.

16. A magnetic sensor, comprising:
a bottom magnetic shield;
a sensor stack formed over the bottom magnetic shield and having first and second sides;
first and second insulation layers, each formed over a side of the sensor stack and over the bottom magnetic shield;
first and second under-layers each formed over at least a portion of one of the first and second insulation layers, each of the under-layers comprising Cu—O; and
first and second hard magnetic bias layers each formed over one of the first and second under-layers;
wherein the under-layer has a top surface with a within the plane axis ratio of 1.6.

17. A magnetic disk drive, comprising:
a housing;
a magnetic media held within the housing;
an actuator pivotally mounted within the housing;
a slider connected with the actuator for movement adjacent to the magnetic media; and
a magnetic sensor formed on the slider, the magnetic sensor further comprising:
a sensor stack having first and second sides;
first and second under-layers each adjacent to a side of the sensor stack, each of the first and second under-layers comprising Cu—O; and
first and second hard magnetic bias layers each formed over one of the first and second under-layers;
wherein each of the first and second under-layers has a top surface that is close to a body centered cubic structure.

18. The magnetic disk drive as in claim 17 wherein each of the under-layers has a thickness of 30 Angstroms or less.

19. The magnetic disk drive as in claim 17 wherein each of the under-layers has a thickness of 10-20 Angstroms.

20. The magnetic disk drive as in claim 17 wherein each of the under-layers has a thickness of about 15 Angstroms.

* * * * *